United States Patent
Chowdhury et al.

(10) Patent No.: US 7,079,714 B2
(45) Date of Patent: Jul. 18, 2006

(54) ELECTRO-OPTIC DEVICES HAVING FLATTENED FREQUENCY RESPONSE WITH REDUCED DRIVE VOLTAGE

(75) Inventors: Aref Chowdhury, Springfield, NJ (US); Douglas M. Gill, South Orange, NJ (US); Mark Lee, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 100 days.

(21) Appl. No.: 10/631,649

(22) Filed: Jul. 31, 2003

(65) Prior Publication Data
US 2004/0136634 A1 Jul. 15, 2004

Related U.S. Application Data

(60) Provisional application No. 60/429,598, filed on Nov. 27, 2002.

(51) Int. Cl.
*G02F 1/035* (2006.01)
(52) U.S. Cl. ................................. 385/3; 385/40
(58) Field of Classification Search ................. 385/1–3, 385/40
See application file for complete search history.

(56) References Cited

U.S. PATENT DOCUMENTS

| | | | | |
|---|---|---|---|---|
| 4,932,738 A | * | 6/1990 | Haas et al. ................. | 385/2 |
| 5,339,369 A | * | 8/1994 | Hopfer et al. .............. | 385/2 |
| 5,416,859 A | * | 5/1995 | Burns et al. ............... | 385/3 |
| 5,647,029 A | * | 7/1997 | Mihailidi et al. .......... | 385/2 |

OTHER PUBLICATIONS

J. L. Jackel et al. High-speed low-voltage modulation with a nonsymmetric Mach-Zehnder interferometer. Journal of Lightwave Technology, vol. 7, No. 6, pp. 937-940, Jun. 1989.*

H. Zhang et al. Push-pull electro-optic polymer modulators with low half-wave voltage and low loss at both 1310 and 1550 nm. Applied Physics Letters, vol. 78, No. 20, pp. 3136-3138, May 14, 2001.*

C. C. Teng. Traveling-wave polymeric optical intensity modulator with more than 40 GHz of 3-dB electrical bandwidth. Applied Physics Letters, vol. 60, No. 13, pp. 1538-1540, Mar. 30, 1992.*

(Continued)

*Primary Examiner*—Sung Pak
*Assistant Examiner*—Mike Stahl (57) ABSTRACT

The present invention is an improved electro-optical device comprising a substrate-supported layer of electro-optical material disposed between upper and lower electrodes. Conventional practice has been to make the electrodes thick to minimize electrical loss. Applicants, in contrast, have discovered that the performance of the device can be improved by making the electrodes thin—typically about 2 microns or less and preferably about 0.5 micron or less. While the thin electrodes take a relatively large loss penalty at low frequencies, at higher frequencies the thin electrodes provide a relatively low loss, thus producing a flattened frequency response as compared with thick electrode devices. The device can maintain a wide operating bandwidth at frequencies of interest for optical transmission while reducing the required drive voltage.

7 Claims, 11 Drawing Sheets

OTHER PUBLICATIONS

Y. Shuto et al. Optical intensity modulators using diazo-dye-substituted polymer channel waveguides. IEEE Journal of Quantum Electronics, vol. 31, No. 8, pp. 1451-1460, Aug. 1995.*

R. Spickermann et al. GaAs/AlGaAs travelling wave electro-optic modulator with an electrical bandwidth >40 GHz. Electronics Letters, vol. 32 No. 12, pp. 1095-1096, Jun. 1996.*

Lee, Mark, et al., *Broadband Modulation of Light by Using an Electro-Optic Polymer, Science*, vol. 298, pp. 1401-1403 (Nov. 15, 2002).

* cited by examiner

ELECTRO-OPTIC DEVICES HAVING FLATTENED FREQUENCY RESPONSE WITH REDUCED DRIVE VOLTAGE

CROSS REFERENCE TO RELATED APPLICATION

This application claims the benefit of U.S. Provisional Application Ser. No. 60/429,598 filed by the present inventors on Nov. 27, 2002 and entitled "Improved Electrooptic Device Employing Polymer Film Waveguides", which is incorporated herein by reference.

FIELD OF THE INVENTION

This invention relates to devices for optical communication systems and, in particular, to electro-optic devices having flattened frequency response.

BACKGROUND OF THE INVENTION

Electro-optic devices are essential components of optical communication systems. By electrically changing the refractive index of material in an optical pathway, they can switch, attenuate or modulate an optical signal.

A commonly used electro-optic device employs an electrical field to control a waveguide path within an electro-optic material such as an electro-optic organic polymer or a thin lithium niobate crystal. The waveguide path is formed locally, as by doping or otherwise altering the material to increase the refractive index. The electrical field applied to the waveguide can controllably vary the refractive index in the path.

Figure 6A:
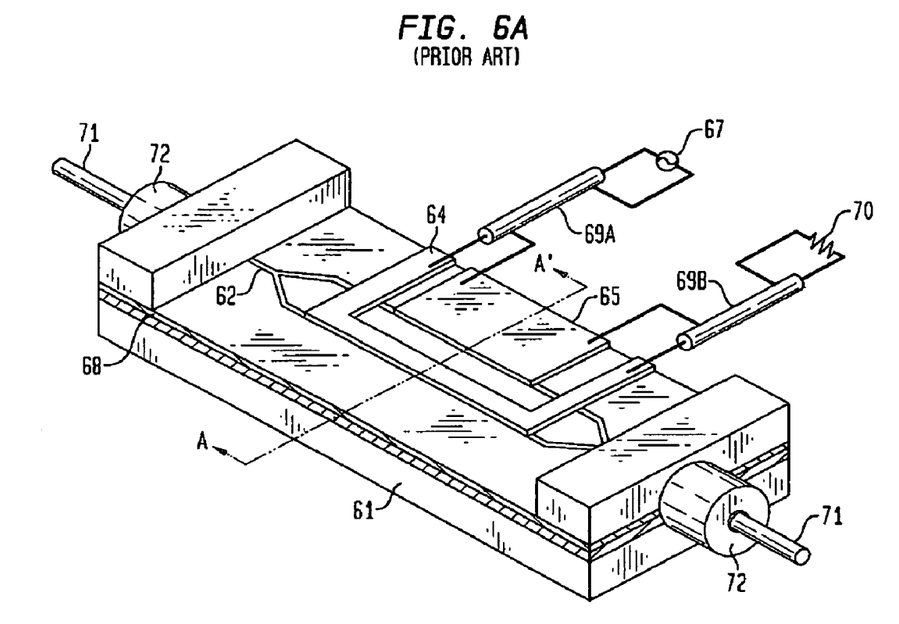
FIGS. 6A and 6B illustrate a conventional electro-optic modulator.

FIG. 6A illustrates a conventional electro-optic modulator comprising an electro-optic material 61 including, at the surface, an optical waveguide path 62 having a greater refractive index than the surrounding cladding material (61, 68). A signal electrode 64 and a ground electrode 65 are provided for controlling the electrical field in the region of waveguide path 62. A dielectric layer 68 that is relatively transparent at the optical frequency of interest and has a refractive index smaller than that of the waveguide can be disposed between the waveguide 62 and the electrodes to reduce absorption of guided light by the electrode metal. A traveling wave signal source 67 is connected to the electrodes, as by a coaxial cable 69A. Similarly, a terminal resistor 70 can be connected by coaxial cable 69B. The end surfaces of the waveguide path 62 can be connected to optical fiber segments 71 by couplers 72.

Figure 6B:
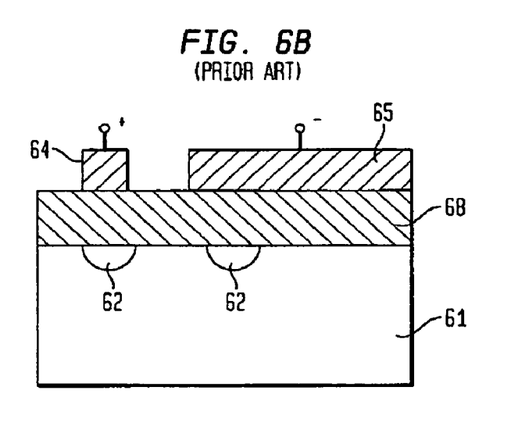

FIG. 6B shows a cross section of the FIG. 6A device along the line A–A'. The electro-optic material 61 can be an electro-optic polymer, a ferroelectric oxide, or a semiconductor. Suitable electro-optic polymers are described in References 1 and 2 cited at the end of this application herein "[1,2]". An exemplary ferroelectric oxide is a thin crystal of lithium niobate (LiNbO.sub.3) cut so that an x-axis of the crystal extends in a longitudinal direction and a z-axis extends in a direction of thickness. Suitable semiconductor materials include gallium arsenide and indium phosphide. The waveguide path 62 is configured in two arms as a Mach-Zehnder interferometer.

In operation, an input optical beam is split between the two arms of the interferometer. The two beams interfere when the arms subsequently couple together. To modulate the beam, a voltage is applied to at least one arm to electro-optically change the refractive index in the arm. If the voltage is properly chosen, it can ensure that the beams destructively interfere and produce no output at the output waveguide which effectively defines an aperture. Thus, for example, an applied electrical signal switched between the voltage required for destructive interference and a different voltage can modulate the transmitted optical beam at a high rate.

To minimize electrical loss, the electrodes have conventionally been made relatively thick (several micrometers) in order to avoid concentrating the electrical power density in a small cross section of material. Such concentration can produce high electrode propagation loss. With high loss, the drive voltage is quickly attenuated along the optical axis of the modulator with the result that only an initial portion of an arm, and not its full length, is effective for modulation. Moreover, this attenuation is aggravated at high frequencies, reducing the highest operative pulse modulation and thus the device bandwidth.

Accordingly, there is a need for improved electro-optic devices having higher operative pulse modulation and increased bandwidth.

SUMMARY OF THE INVENTION

The present invention is an improved electro-optical device comprising a substrate-supported layer of electro-optical material disposed between upper and lower electrodes. Conventional practice has been to make the electrodes thick to minimize electrical loss. Applicants, in contrast, have discovered that the performance of the device can be improved by making the electrodes thin—typically about 2 microns or less and preferably about 0.5 micron or less. However, the optimal electrode thickness is dependent on the conductivity of the electrode metal. While the thin electrodes take a relatively large loss penalty at low frequencies, at higher frequencies the thin electrodes provide a relatively low loss, thus producing a flattened frequency response as compared with thick electrode devices. The device can maintain a wide operating bandwidth at frequencies of interest for optical transmission while reducing the required drive voltage.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

This description is divided into two parts. Part I describes the structure and operation of devices in accordance with the invention. Part II, written for those skilled in the art, describes the theory of the devices and compares designs using the invention with conventional designs.

I. Structure and Operation

Figure 1A:
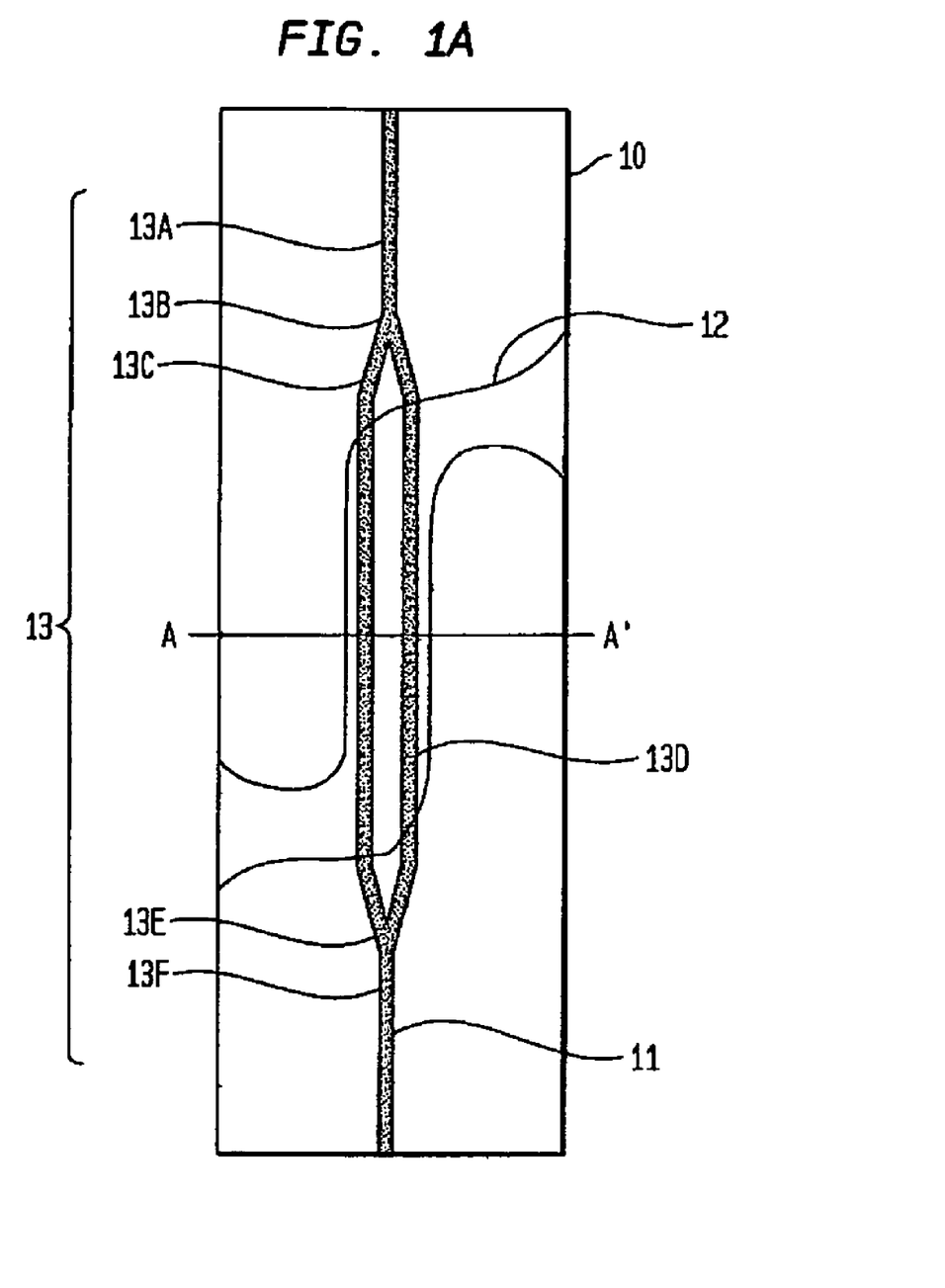
FIGS. 1A and 1B are schematic diagrams of the top and cross sectional views of an exemplary electro-optic device in accordance with the invention.

FIG. 1A is a schematic top view of an exemplary electro-optic modulator in accordance with the invention comprising a substrate 10, an electro-optic waveguide 11 overlying and ultimately supported by the substrate, an upper electrode 12 overlying the waveguide 11 and a lower electrode structure. The waveguide 11 is in the form of a Mach-Zehnder interferometer 13, having an input 13A, a beam splitter 13B, a pair of waveguide arms 13C and 13D, a beam combiner 13E and an output 13F.

Figure 1B:
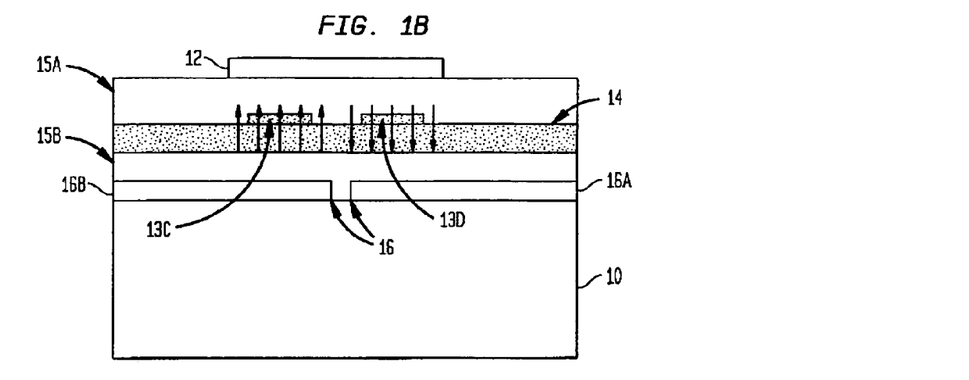

FIG. 1B is a section across AA'. As can be seen from the cross section of FIG. 1B, the waveguiding structure conveniently comprises a waveguide layer 14 with a patterned guiding core 11 (FIG. 1A). The core layer 14 is disposed between upper and lower cladding layers 15A and 15B, and the cladding layer 15B is disposed on one or more lower electrodes 16A, 16B. In this particular embodiment the lower electrode 16 is a split electrode structure (a slotted ground plane) so that the two Mach-Zehnder arms 13C and 13D can be poled with opposite polarity. Thus, the voltage applied to upper electrode 12 will produce opposite shifts in the refractive indices of arms, 13C and 13D, reducing the voltage required for electrode 12 to produce a desired phase differential between the two arms.

Figure 7:
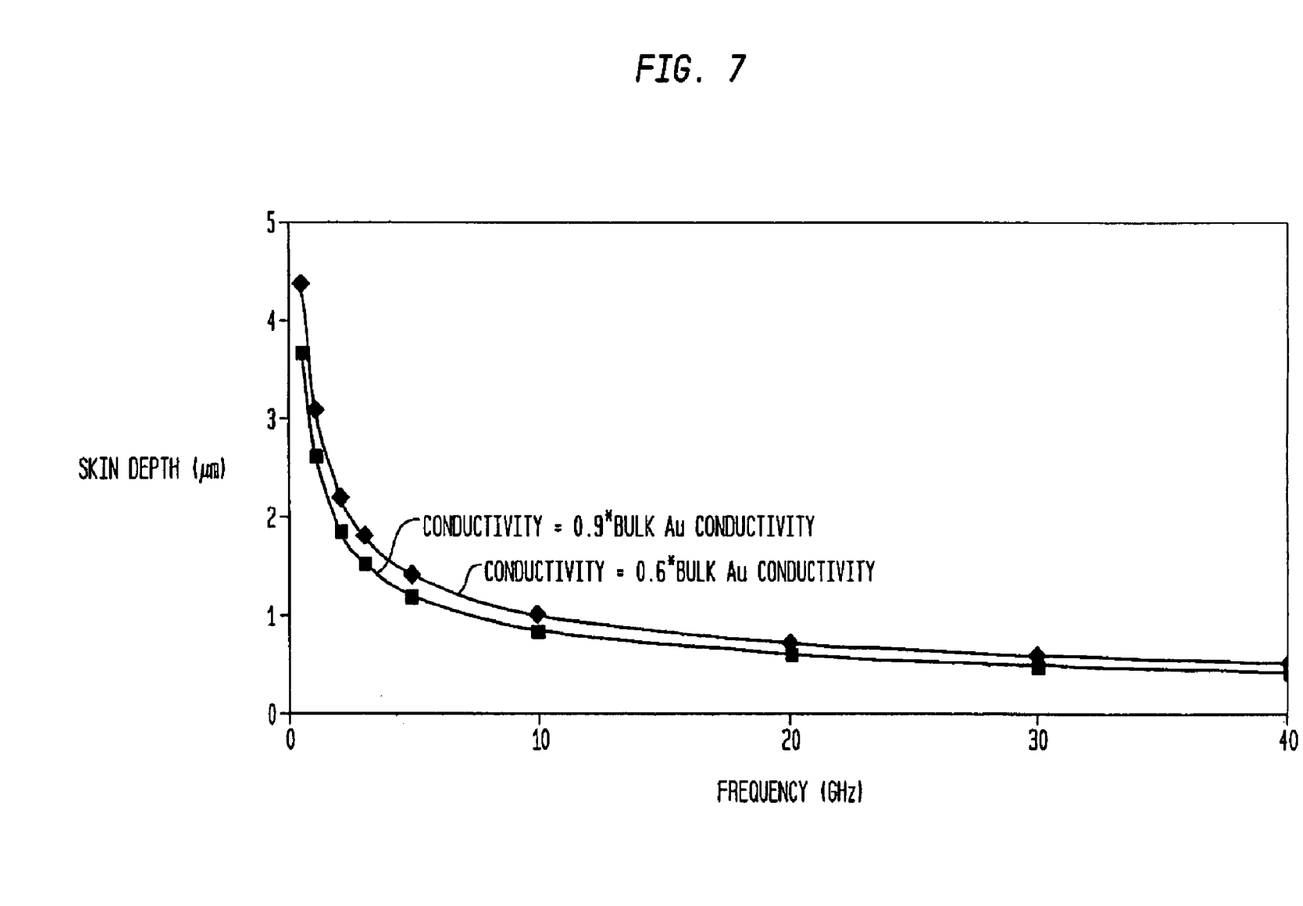
FIG. 7 is a graphical illustration of skin depth versus frequency for bulk gold.

In accordance with the invention, at least one of the electrodes 12 and 16 are thin as compared with the relatively thick electrodes in conventional electro-optic devices. The higher the conductivity of the electrode material, the thinner the electrode can be. Quantitatively, the electrode thickness is advantageously less than about three times the skin depth at the frequency defined as the 3 dB electrical bandwidth response of the modulator (hereinafter "the 3 dB frequency") and preferably less than about twice this designated skin depth. This skin depth $\delta_s$ can be calculated by the relation $$\delta_s = \sqrt{\frac{1}{\pi f \mu_o \sigma}},$$

where f is the frequency, $\mu_o$ is the permeability of free space and $\sigma$ is the conductivity of the electrode. On contemplated applications the 3 dB bandwidth is about 7 GHz or greater. Gold is the most commonly used electrode material for electro optic modulators of this type. FIG. 7 shows the skin depth for gold as a function of frequency. Advantageously, a thin electrode has a thickness of about 2 micrometers or less and preferably 0.5 micrometer or less.

The unexpected advantage of using the thin electrodes is a flattened frequency response across the response bandwidth of interest for fiber optic transmission. This provides a wide operating bandwidth and when used in conjunction with modulator design principles (e.g. [4]) can reduce the necessary drive voltage by 20% or more.

II. Underlying Theory and Comparative Examples

In the following, we also discuss techniques to effectively 'flatten out' the frequency response of the electro-optic modulators, through the use of an appropriate electrode design, to improve device performance and figure of merit. In addition, we consider specific device designs for 40 Gb/s, and 160 Gb/s system applications to give an indication of the expected performance. We also look at the expected performance of various polymer modulator structures that incorporate the concept of manipulating the constituent materials in order to increase overlap and minimize drive voltage, thereby improving device performance over previously reported designs. We show that by careful selection of appropriate constituent materials, and by incorporating ridged structures into the microwave/optical interaction region, the device drive voltage can be significantly reduced.

Three basic physical device characteristics required for efficient operation need to be considered. The first requirement in a guided optical wave device is that the optical waveguide core has a higher optical dielectric constant than that of the cladding in order to confine the light. A second requirement in traveling-wave devices is that the microwave and optical radiation propagate at similar speeds within the interaction region of the modulator; the advantages traveling-wave modulators have are that they can achieve higher bandwidths than would otherwise be allowed by electrical capacitive effects and transit-time limitations. For example, we roughly estimate the RC time constant for lumped operation of the devices discussed to be on the order of 100 ps. Finally, a microwave impedance match (typically 50 Ω) between the modulator and the external microwave driver is essential for broadband operation.

The microwave-optical overlap, another attribute of modulator design, does not impact device bandwidth but impacts the drive voltage required by the modulator. The microwave/optical overlap can be increased if the microwave dielectric constant of the optical waveguide core is lower than that of the cladding, which stands in contrast to the requirements for the optical frequency dielectric constants. By using appropriate materials such that the core microwave dielectric constant is lower than that of the cladding (while the core optical dielectric constant is higher than that of the cladding), one can significantly increase the microwave field strength in the core of the device. This increases the microwave-optical overlap and lowers the required device drive voltage. Furthermore, maximizing the contrast between the microwave dielectric constants of the core and cladding will tend to maximize the microwave/optical overlap.

The expected drive voltages and response curves for the device designs discussed were calculated based on the following. The modulation frequency response of a traveling-wave modulator that is impedance matched is given by:

$$M(v) = \frac{e^{-\frac{\alpha(v)L}{2}}\sin^2\left(\frac{\gamma L}{2}\right) + \left(\frac{1}{4}\right)\left(1 - e^{-\frac{\alpha(v)L}{2}}\right)^2}{\left(\frac{\gamma L}{2}\right)^2 + \left(\frac{\alpha(v)L}{4}\right)^2} \quad (1)$$

where $\alpha(v)$ is the frequency-dependent microwave power attenuation coefficient, L is the active length of the device, and $\gamma = 2\pi v(N_m - N_o)/c$ where $N_m$ is the effective microwave index, $N_o$ is the effective optical index and c is the speed of light in vacuum.

The solution to the transcendental equation $M(v)=0.5$ is what is referred to as the 3 dB electrical (dBE) bandwidth. In order to properly compute the modulation response, it is essential to have a good estimation of the microwave power attenuation, and microwave and optical effective indices. The microwave power attenuation mainly depends on the material (typically gold) and geometry of the electrodes. For our calculations, the frequency-dependent microwave power attenuation was estimated using numerical models based on the electrode design. The effective microwave index was obtained by performing an electrostatic simulation of the modulator. The electrostatic analysis yields the capacitance per unit length $C_m$ (F/m) of the device. We then replaced all the dielectrics with air and repeated the simulation, which then yielded the line capacitance in air $C_0$. The effective microwave index is then given by $N_m=(C_m/C_0)^{0.5}$. This electrostatic approximation approach is reasonable given that the dimensions of the cross-section of the electrodes are at least an order of magnitude smaller than the wavelength of the microwave radiation. For optical waveguides with ridge structures, the 2-D effective index method is an extremely good approximation for the optical effective index. Thus, all effective indices were calculated by this method.

The DC switching voltage of a modulator is given by $$V_\pi = \frac{\lambda G}{N_o^3 r \Gamma L} \tag{3}$$

where $\lambda$ is the optical wavelength, G is the gap between the electrodes, r is the electro-optic coefficient, L is the active length of the device, and $\Gamma$ is the microwave-optical overlap factor. The microwave-optical overlap factor is given by [7]

$$\Gamma = \frac{G}{V} \frac{\int\int E_o^2(x,z)E_m(x,z)dxdz}{\int\int E_o^2(x,z)dxdz} \tag{4}$$

where V is the applied voltage, $E_o$ is the optical field, $E_m$ is the microwave field, and x and z are the axes in the plane of the cross-section of the modulator. $\Gamma$ consists of the overlap of both waveguides in the MZM interaction region, $\Gamma_1+\Gamma_2$, where $\Gamma_i$ is the microwave-optical overlap of the $i^{th}$ waveguide. We note that since only the core layer is electro-optically active, the limits of the upper integral should only encompass the 2-D space of the cores while the limits of the lower integral should encompass the full 2-D space of the optical mode of both waveguides. For our calculations, the following method was employed to calculate the overlap. The multilayer structure of the polymer modulator is essentially a parallel-plate capacitor; as a result, the electric field in the core region is essentially constant (neglecting fringe effects). The microwave electric field can now be brought out of the integral in Equation 4 and the ratio of the integrals represents just the optical overlap factor with the core. For the indices and dimensions chosen for the polymer modulator, the ratio of the integrals is about 0.93–0.95.

In the traveling-wave configuration of the modulator, a microwave pulse that starts out with a voltage $V_o$ is attenuated as it propagates along the electrode. In addition, the attenuation is frequency dependent. Therefore, the voltage as a function of distance d and frequency $v$ can be expressed as $$V(d, v) = V_o \exp\left(-\frac{\alpha(v)}{2}d\right) \tag{5}$$

Note that $\alpha(v)$ is divided by 2 since $\alpha(v)$ is the power attenuation and we need the field attenuation. In order to assess the value of the applied voltage needed to produce an effective $V_\pi$, we must consider the integrated effect of the voltage over the modulator length L. From a simple integration, it can be shown that the applied voltage at the input of the modulator to produce an effective $V_\pi$ is given by $$V_0(v) = \frac{\frac{\alpha(v)}{2}V_\pi L}{1-\exp\left(-\frac{\alpha(v)}{2}L\right)}. \tag{6}$$

Figure 2A:
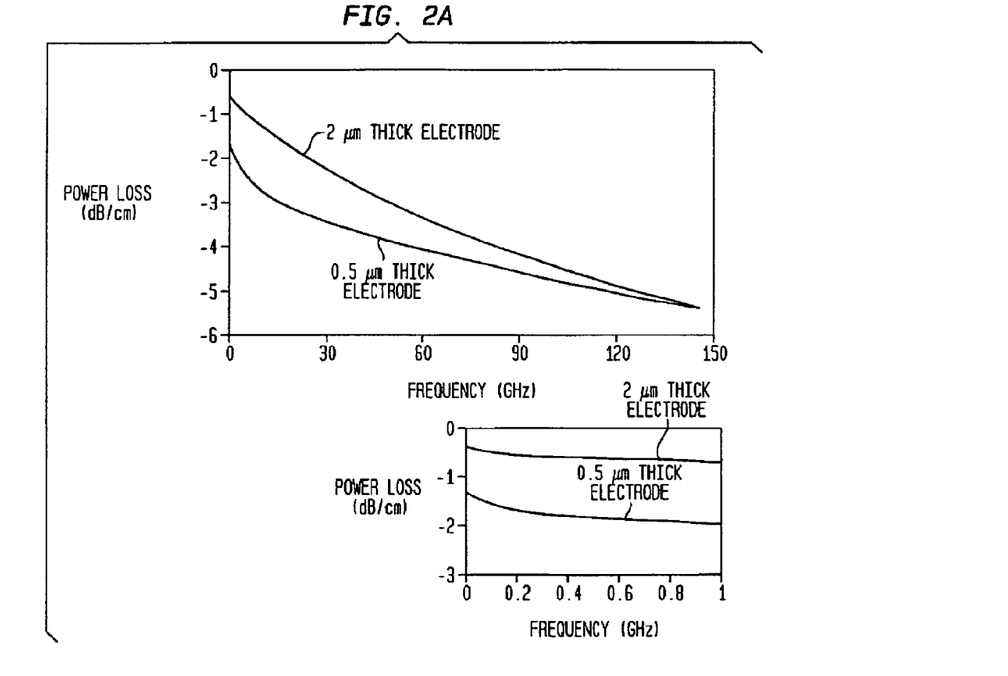
FIGS. 2A and 2B are graphical illustrations of calculated power loss per centimeter as a function of frequency for different thickness upper electrodes.
Figure 2B:
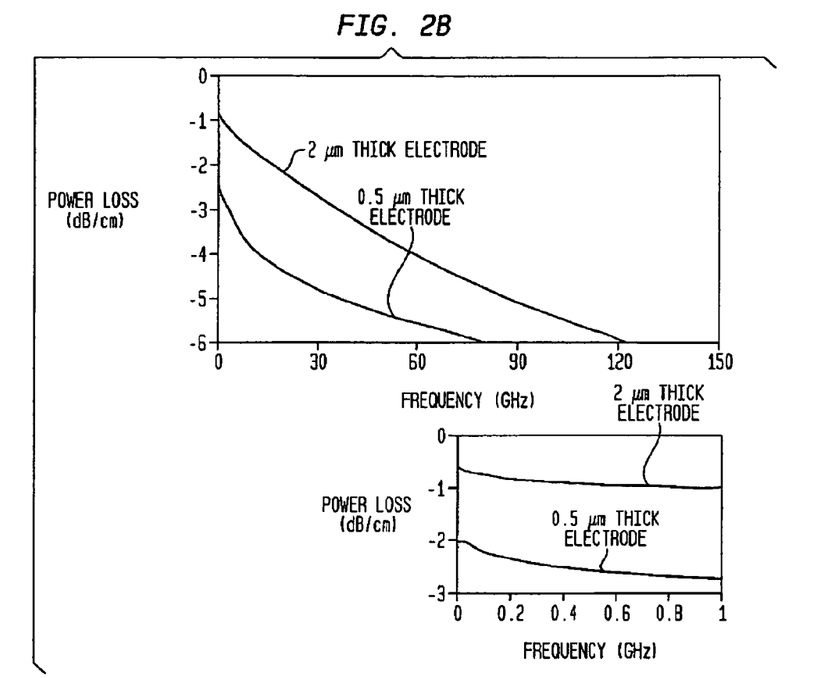

The microwave propagation loss factors, $\alpha(v)$, were calculated by first determining the low frequency sheet resistance and the high frequency skin effect surface impedance expected from a given electrode. The sheet resistance is given by $$R_{DC} = \frac{1}{(t\sigma)} \tag{7}$$

where $\sigma$ is the conductivity of the electrode metal and t is the electrode thickness. The high frequency microwave propagation loss is frequency dependent and is determined by multiplying the square root of the frequency by the skin effect coefficient. The skin effect coefficient is given by $$R_{RF}=\sqrt{\pi\mu_o/\sigma} \tag{8}$$

where $\mu_o$ is the permeability of free space. The high frequency skin effect surface impedance dominates the electrode loss when the skin depth of the microwave radiation becomes significantly smaller than the electrode thickness. In addition, the skin depth of the microwave radiation is dependent on the conductivity of the metal used in the electrode. Whether $R_{DC}$ or $R_{RF}$ dominates the electrode response is dependent on both electrode thickness and conductivity. We also note that with the thinner electrodes there is a very large initial drop off from the DC to the low frequency response. This is seen because the DC response is independent of the electrode loss. However, the electrode sheet resistance dictates the low frequency response, which is quite large in devices with thin electrodes. As an example, we show in FIG. 2A the simulation of the microwave propagation loss $\alpha(v)$ for a 1 cm long 500 nm thick and a 1 cm long 2 μm thick microstrip electrodes with a conductivity that is 90% that of bulk Au ($\sigma_{Bulk\ Au}=4.09\times10^7$ S/m). A similar graph is shown in FIG. 2B for 500 nm and 2 μm thick electrodes with a conductivity that is 60% that of bulk Au. The software package Sonnet™ was used to interpolate between the $R_{DC}$ and $R_{RF}$, response regimes. FIG. 2A shows that for these electrode thicknesses and conductivity, the two response curves converge at ~140 GHz. So the response above 120 GHz is dominated by the $R_{RF}$ response and below 10 GHz the response is dominated by the $R_{DC}$ response; between these regimes, we have a combination of the two.

The graphs and results were obtained using the above simulation and analytical techniques. As discussed, the bandwidths of the devices to be considered are calculated from the expected velocity match and electrode propagation loss. The impedance is considered to be essentially matched for the devices and no microwave reflection is assumed at the termination of the device interaction region. In addition, a number of the designs presented have similar electrode structures, line capacitance, and optical waveguide effective indices—this means that the velocity mismatch, electrode losses, and consequently, bandwidths are also similar in these designs. However, these devices have different microwave-optical overlap and thus, the drive voltage for each design is different.

The bandwidth stated is referenced to the DC response, which is independent of the electrode loss as shown by Equation 3. Modulator response is considered using loss factors from 0.5 µm and 2 µm thick electrodes. We also note that device bandwidth is strongly dependent on electrode conductivity, and that the conductivity of a metal depends on the deposition technique. Therefore, we calculate device responses for two representative examples. For thinner electrodes (<2 µm) a conductivity that is 90% that of bulk Au is used, and for thicker electrodes (~2 µm) a conductivity of 60% that of bulk Au is used, representing electron beam deposited and electroplated electrodes, respectively.

We consider five device designs. The general design strategy is based on trying to create the greatest contrast possible between the microwave dielectric constant of the optical waveguide core, $\epsilon_{core}$, and cladding, $\epsilon_{clad}$, i.e., we want to make $\epsilon_{core}$ as small as possible and $\epsilon_{clad}$ as large as possible. This needs to be done while maintaining the proper line capacitance to achieve velocity and impedance matching. The approach taken is to increase $\epsilon_{clad}$, which increases the device line capacitance, and then introduce a ridge into the interaction region to bring the line capacitance down to a level appropriate for velocity and impedance matching. Although optical waveguide ridges have been used in LiNbO$_3$ modulators [8], to the best of our knowledge, this approach has not been proposed for polymer-based devices.

Figure 3A:
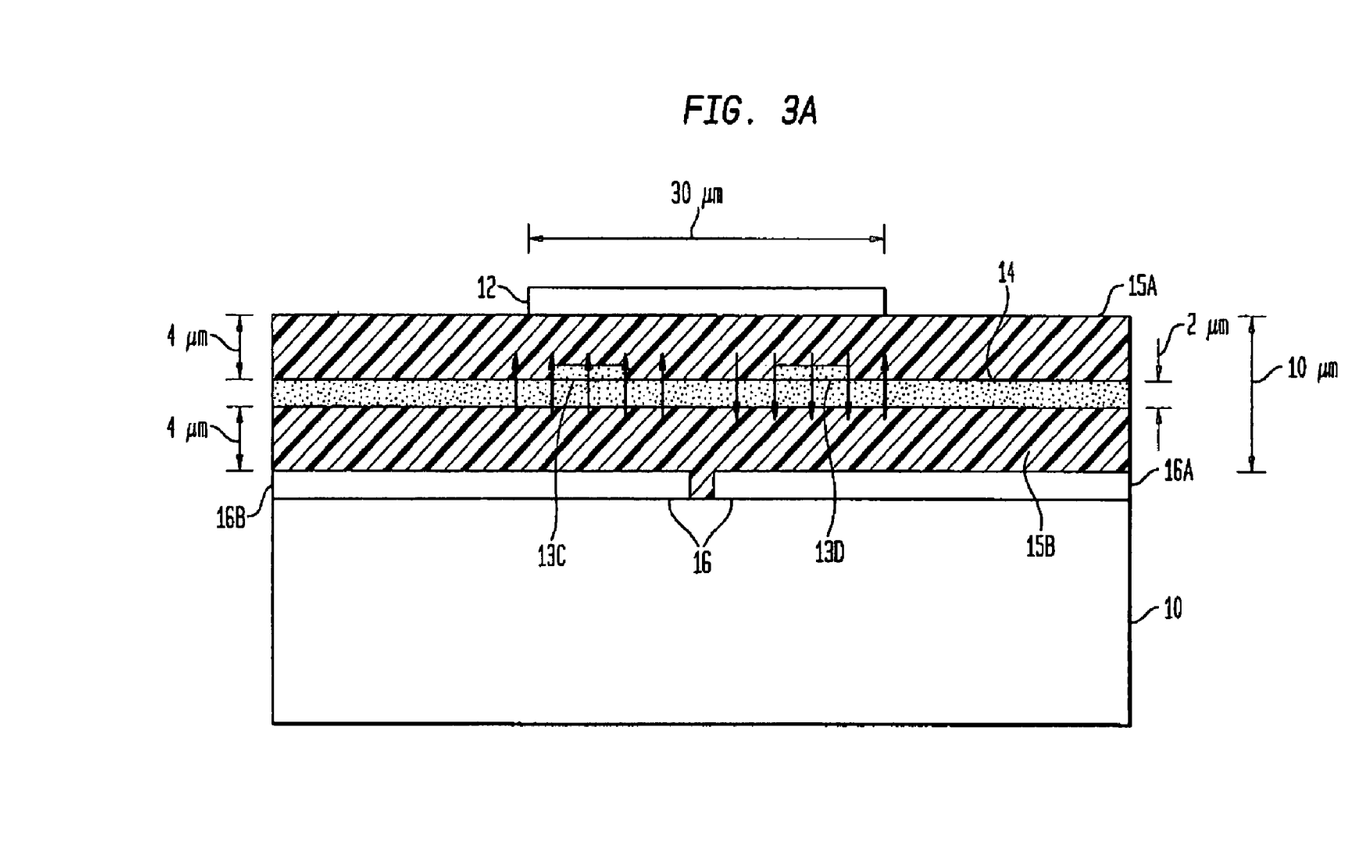
FIGS. 3A, 3B, 3C, 3D and 3E are schematic cross sections of five electro-optic test devices.
Figure 3B:
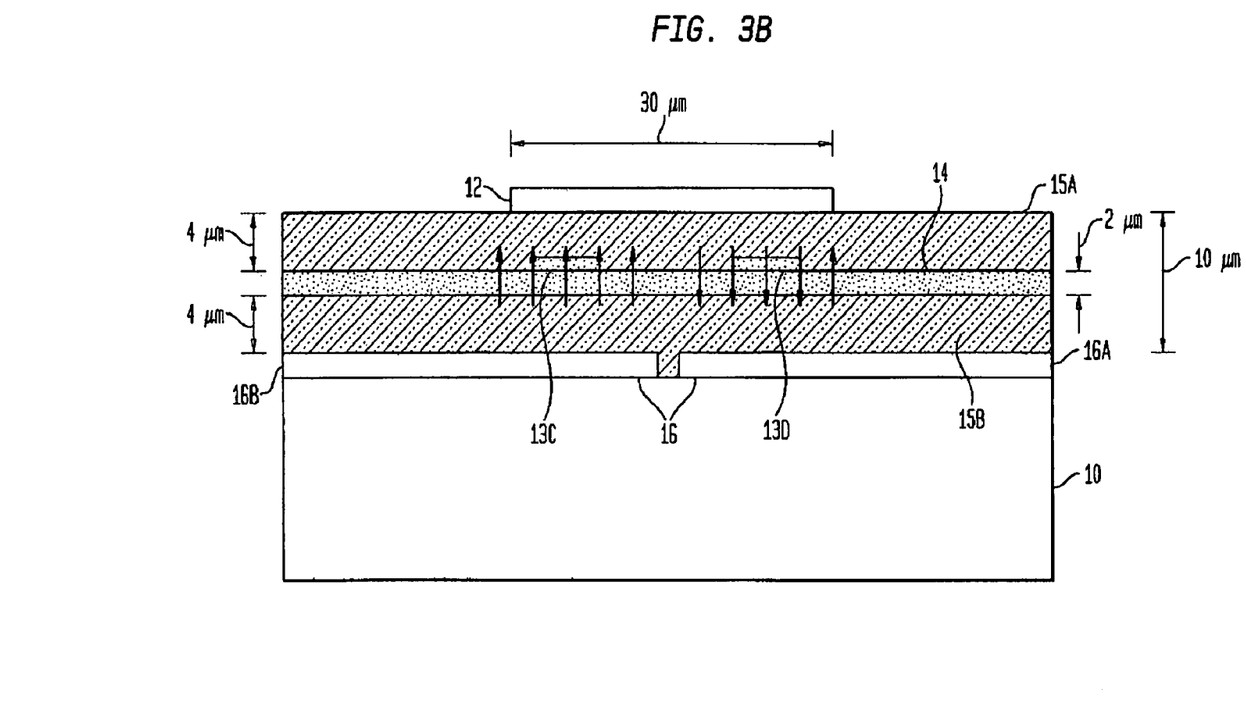
Figure 3C:
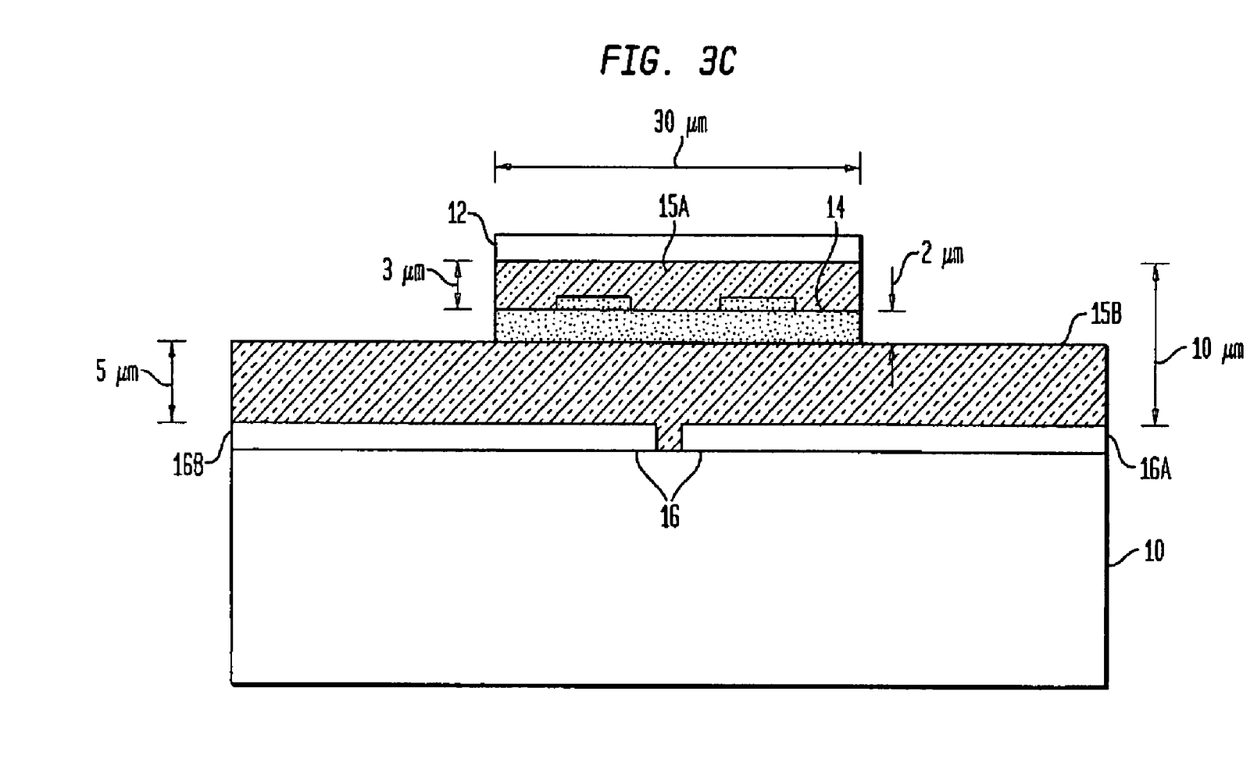
Figure 3D:
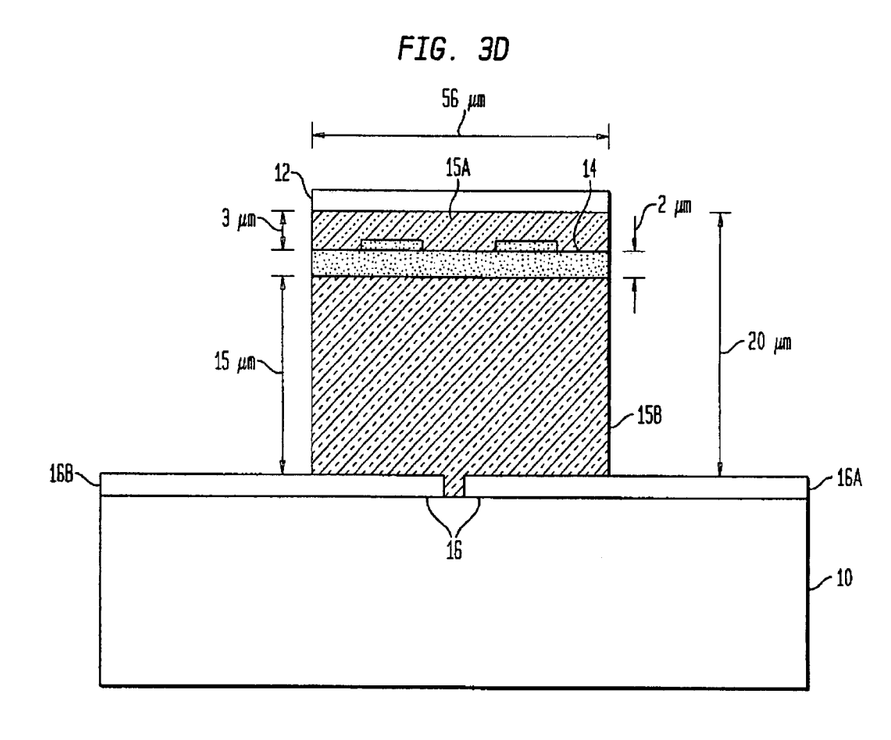
Figure 3E:
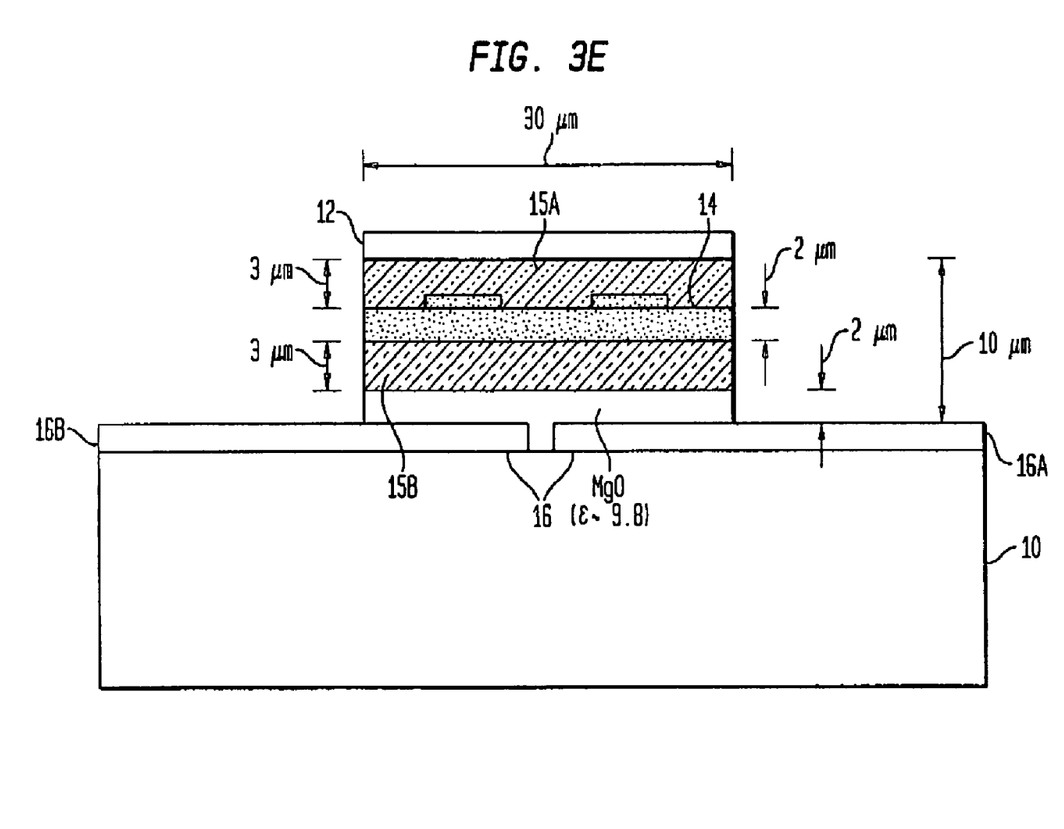

The first design considered is based on previously published work using a Polyurethane-Dispersed Red 19 (PUR-DR19) waveguide core and Epoxylite cladding [1,9] as shown in FIG. 3A. This choice of materials requires a planar design (no ridge) to minimize velocity and impedance mismatches. Since the interaction region of the modulator is basically isolated from the substrate by the ground plane, these types of devices have been fabricated on a variety of materials including flexible Mylar substrates, however, a silicon wafer is a more typical substrate choice [3]. FIG. 3B is also a planar design and is based on a recently proposed structure that uses a crosslinked poly (methyl methacrylate-co-hydroxyethyl methacrylate) 9:1 copolymer (PMMA) doped with an appropriate dye for the core, and glass resin (GR) as the cladding material [6]. The third and fourth designs are similar to the second in that the upper cladding and core are made of PMMA and GR, respectively; however, the lower cladding is replaced with SiO$_2$ and a ridge is incorporated into the structure as shown in FIGS. 3C and 3D. The difference between the third and fourth designs is that the third design has a gap of 10 µm whereas the fourth design has a gap of 20 µm. FIG. 3E shows the final design, which uses a lower cladding formed from an MgO/SiO$_2$ combination and a fully etched ridge. This design is presented mainly to convey the idea that multiple materials can be used in the cladding region to achieve the desired impact to the effective dielectric constant of the modulator cladding/core combination. We note tat if the MgO/SiO$_2$ lower cladding combination were replaced with a single material that had an appropriate optical dielectric constant and a microwave dielectric constant of ~4.9, nearly identical device behavior would be achieved. The calculated optical propagation constant, microwave propagation constant, line impedance, bandwidth, in addition to the electrode length, thickness, and conductivity are shown in Table 1 for each design.

TABLE 1

| Device Design of Figure | $n_{opt}$ | $n_{RF}$ | Impedance (Ohms) | Device Interaction Length (cm) | Electrode Thickness (µm) | Electrode Conductivity (Percentage of bulk Au) | DC Referenced 3 dBE Bandwidth (GHz) |
|---|---|---|---|---|---|---|---|
| 3a | 1.62 | 1.47 | 46 | 2 | 0.5 | 90 | 12.8 |
| 3a | 1.62 | 1.47 | 46 | 2 | 2.0 | 90 | 26 |
| 3a | 1.62 | 1.47 | 46 | 2 | 2.0 | 60 | 23 |
| 3b, 3c & 3e | 1.50 | 1.53 | 45 | 2 | 0.5 | 90 | 19 |
| 3b, 3c & 3e | 1.50 | 1.53 | 45 | 2 | 2.0 | 90 | 49 |
| 3b, 3c & 3e | 1.50 | 1.53 | 45 | 2 | 2.0 | 60 | 38 |
| 3d | 1.50 | 1.53 | 48 | 3.5 | 0.5 | 90 | 21 |
| 3d | 1.50 | 1.53 | 48 | 3.5 | 2.0 | 90 | 45 |
| 3d | 1.50 | 1.53 | 48 | 3.5 | 2.0 | 60 | 36 |

The bandwidth of design 3(a) is seen to be significantly lower than that of the other designs. In the interest of a consistent comparison, design 3(a) has been slightly modified from that presented in [1,9]. However, the expected performance has not been significantly changed. The significantly lower bandwidth from design 3(a) is a result of the large velocity mismatch between the propagating optical and microwave fields in this design, as previously indicated in [6]. This is due to the choice of constituent materials and is a fundamental result that is caused by the need to strike a compromise between the velocity and impedance matching in the microwave/optical interaction region. Generally speaking, the 3 dBE bandwidths of designs 3(b)–(e) are expected to be anywhere from 20 to 50 GHz. Designs 3(b)–(e) are essentially velocity matched in these frequency ranges of operation and so the response characteristics are dominated by electrode loss.

Now we consider the expected microwave/optical overlap, drive voltage, and the figure of merit for these designs. The figure of merit (FOM) used is the bandwidth divided by the drive voltage squared (GHz/V²) [10]. Reference 10 elaborates why this figure of merit should be used (especially for near-velocity-matched modulators) rather than the more commonly used GHz/V figure of merit.

First we note that the microwave dielectric constant of the core material for design 3(a) is higher than that of the cladding (PUR-DR19 core $\epsilon_{core}$~3.2 and Epoxylite cladding layer $\epsilon_{cladding}$~2.5). The microwave-optical overlap in this device is calculated to be ~0.81 per waveguide with a 10 µm electrode gap. In light of the previous discussion, the overlap can be improved with a choice of materials such that the microwave dielectric constant of the core is made lower than that of the cladding. For example, design 3(b) uses a PMMA+DR1 core ($\epsilon_{core}$~2.25) and GR cladding ($\epsilon_{cladding}$ ~ 2.9) layers [6] and gives an overlap of ~1.215 per waveguide—that is a ~50% increase in overlap over the PUR-DR19 core device and corresponds to a ~33% decrease in required drive voltage. In design 3(c) (SiO₂/PMMA+Dye/GR) the microwave-optical overlap is further improved by increasing the contrast between the microwave dielectric constant of the core and lower cladding. A partial ridge is used to realize the proper line capacitance to achieve a good velocity and impedance match. The calculated overlap for this design is ~1.4 per waveguide, more than a 70% improvement in overlap compared to the PUR-DR19 core device and a 15% improvement over the (GR/PMMA+DR1/GR) design.

Since only a partial ridge was used in the previous design the overlap can be further improved by increasing the microwave dielectric constant of the cladding layers. The subsequent increase in line capacitance can then be compensated by fully etching the ridge structure to the ground plane as shown in FIG. 3D. Two basic approaches can be used to increase the aggregate dielectric constant of the cladding layers: incorporation of a higher microwave dielectric constant material into the cladding region (FIG. 3E, or increasing the electrode gap so that a thicker layer of lower cladding SiO₂ $\epsilon_{SiO2}$~3.9) can be used as in FIG. 3D. In considering these approaches, we note that our calculations indicate that a minimum of ~2.5 µm thick cladding layer needs to be used in order to isolate the optical waveguide from the device electrodes. As a result, proposed designs must conform to this minimum cladding thickness requirement.

First we discuss the option of increasing the electrode gap to increase the thickness of the SiO₂ cladding layer. Our calculations show that with the use of a 20 µm gap, the minimum 2.5 µm upper cladding layer can be maintained and an excellent velocity and impedance match can be realized with the use of a fully etched ridge. We find that the overlap for this design is ~1.58 per waveguide. This is a ~90% increase in overlap compared to that of design 3(a). However, the increased electrode gap makes it necessary to significantly increase the device length to achieve a drive voltage that is comparable to most of the other designs considered. Alternatively, a higher dielectric material can be introduced into the cladding. For example, the use of a thin layer of MgO $\epsilon_{core}$~9.7) could create a similar effect without the need to increase the electrode gap as in FIG. 3D. The overlap calculated from this design was found to be ~1.47 per waveguide.

The calculated overlap, required drive voltages, and figures of merit for the above designs with 2 cm long interaction regions are shown in Table 2.

TABLE 2

| Device Design of Figure | Device Interaction Length (cm) | Microwave-Optical overlap Γ | DC Half-Wave Voltage (V) | 3 dBE Bandwidth with 2 µm thick & 60% conductivity electrodes (GHz) | Figure of Merit (GHz/V²) |
|---|---|---|---|---|---|
| 3a | 2.0 | 0.81 × 2 | 3.73 | 23 | 1.65 |
| 3b | 2.0 | 1.22 × 2 | 2.49 | 38 | 6.13 |
| 3c | 2.0 | 1.40 × 2 | 2.16 | 38 | 8.14 |
| 3d | 3.5 | 1.58 × 2 | 2.19 | 36 | 7.51 |
| 3e | 2.0 | 1.47 × 2 | 2.06 | 38 | 8.95 |

Figure 4A:
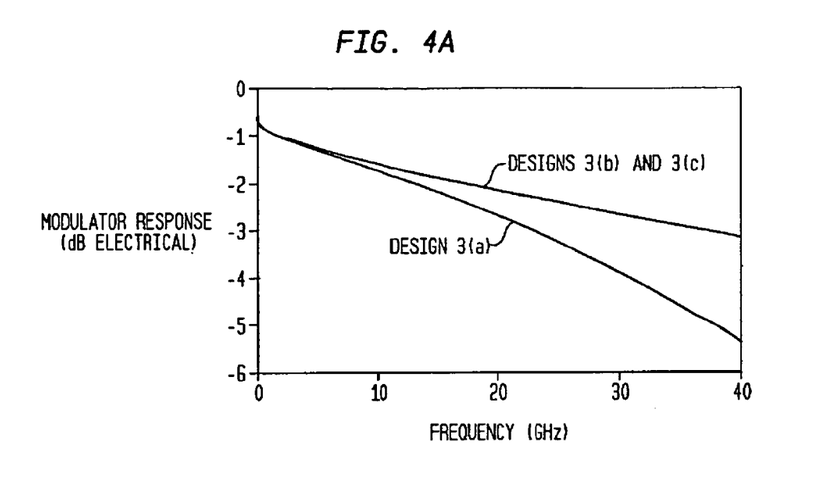
FIG. 4A is a graphical illustration of the expected electrical modulation response versus frequency for test devices of FIG. 3.
Figure 4B:
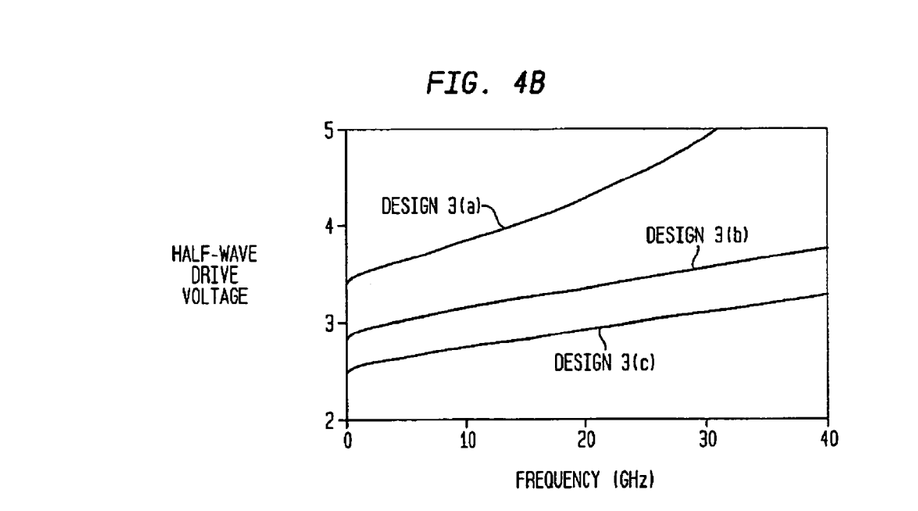
FIG. 4B illustrates the expected half-wave drive voltages versus frequency for the test devices of FIG. 3.

The required drive voltage at bandwidth can be determined by simply multiplying the indicated half wave voltage by √2. An electro-optic coefficient of $r_{33}$ ~30 pm/V was assumed in these calculations. Although larger electro-optic values have been reported [2] there appears to be somewhat of a positive correlation between a large electro-optic value and the susceptibility of an EO polymer to photo-degradation. Thus, we have chosen a value of $r_{33}$ ~30 pm/V as a compromise between material response and stability. We note that the electro-optic coefficients reported in References 1, 6 and 9 are different from that of 30 pm/V. We, however, have chosen to use the same value for the electro-optic coefficient in all devices for design comparison purposes. Response and drive voltage curves for selected designs from Table 2 are shown in FIGS. 4A and 4B. The impact of the device package is not included in these simulations.

Device Parameters and Performance from a Systems Perspective

Consideration of the various 0.5 µm and 2.0 µm thick electrode designs allows us to discuss specific device configurations for system applications. This will allow us to convey design trade-offs that can be made with polymer devices when they are being considered for use in practical systems. In a system, the absolute low frequency response required of a modulator is in the hundreds of kHz range; however, there is very little energy in this part of the data frequency spectrum. For example, with LiNbO₃ modulators [5], which are currently the technology of choice for 40 Gb/s long-haul commercial systems, there is a sharp ~1 dB drop in response above the acoustic resonance frequencies of ~20 MHz [11–12]. This low-end roll-off in response does not seem to have a significant impact on the performance of these transmitters in a system. Therefore, using a DC reference for characterizing the usable bandwidth of an optical transmitter is not entirely relevant for the consideration of a system application for the modulator. It is reasonable to use some finite low-end frequency response as a reference point in determining the usable modulator bandwidth and effective $V_\pi$. This is of interest in the case of polymer modulators because the use of thin drive electrodes creates a sharp, very large low frequency drop-off in response; however, there is much less impact on the high frequency response. As discussed previously, the very large initial drop off from the DC to the low frequency response with the thinner electrodes is seen because the DC response is independent of the electrode loss. However, the electrode sheet resistance dictates the low frequency response, which is quite large in devices with thin electrodes. Given that the extreme low frequency device response (<20 MHz) need not be extremely flat, we can essentially flatten out the response of the device at higher frequencies (>20 MHz) with the proper choice of electrode design. We are merely acknowledging that the extreme low-end response of the modulator can be sacrificed. This eases the design constraints and can improve performance. In addition, the use of thin electrodes to improve modulator response is contrary to the general design approaches traditionally used with $LiNbO_3$ modulators.

Figure 5:
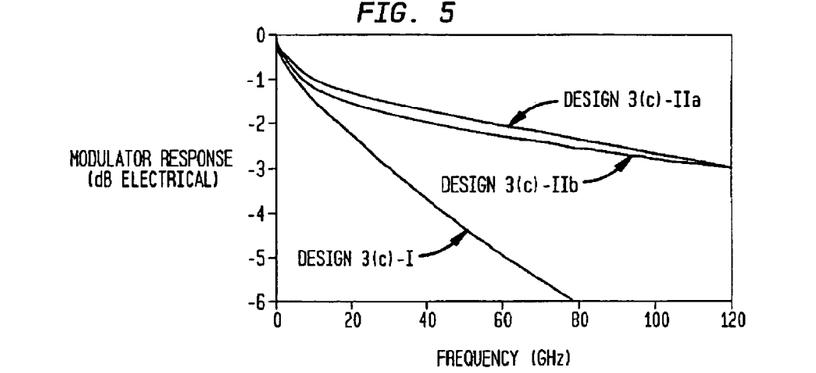
FIG. 5 plots the expected electrical modulation response as a function of frequency for test devices of FIG. 3.

We now revisit the bandwidth and $V_\pi$ calculations for some specific design examples. This time we use a non-DC reference frequency of 20 MHz to determine device characteristics. In addition, we generally limit the response roll-off from DC to 20 MHz to ~1 dB. We call the 20 MHz referenced response characteristics as the "AC referenced" bandwidth and $V_\pi$. We would also like to remind the reader that all of the designs discussed are single-ended devices. The first design considered is labeled design 3(c)-I and is based on the interaction region cross-section design 3(c), shown in FIG. 3C as discussed above. As shown in Table 3 and FIG. 5, this design has an AC referenced bandwidth of 30 GHz, a 3 cm interaction length, and 2 μm thick Au electrodes with conductivity 60% that of bulk gold.

enced designs. It is also worth mentioning that if one can tolerate a low frequency roll-off of more than 1 dB then the figure of merit for all of these designs can be further improved. From a practical perspective, design 3(c)-I is very attractive (30 GHz bandwidth and ~1.6 volt $V_\pi$) since it offers broadband performance with a low drive power requirement. In addition, this design may still be practicably applicable even with the relatively large optical absorption currently found in these materials. The velocity matched 120 GHz bandwidth device also has a very strong figure of merit; however, the implementation of such a modulator in a 160 GHz system with current microwave driver technologies is not yet practical.

Basic consideration of the utilized bandwidth of optical transmitters in long-haul systems indicates that by sacrificing very low frequency response one can realize more efficient performance. A technique of sacrificing the response of an optical transmitter in the extreme low frequency regime to enhance performance in the response regime most relevant to telecommunications has been demonstrated through the use of both thin modulator electrodes and a modification of the microwave/optical interaction length. Calculations indicate that without the use of this

TABLE 3

| Device Design of Figure | $n_{opt}$ | $n_{RF}$ | Impedance (Ohms) | Device Interaction Length (cm) | Electrode Thickness (μm) | Electrode Conductivity (Percentage of bulk Au) | Low Frequency Half-Wave Voltage (V) | DC to 20 MHz drop in response (dBE) | AC Referenced 3 dBE Bandwidth (GHz) | Figure of Merit (GHz/$V^2$) |
| --- | --- | --- | --- | --- | --- | --- | --- | --- | --- | --- |
| 3c-I | 1.53 | 1.50 | 45 | 3.01 | 2.0 | 60 | 1.59 | −0.9 | 30 | 11.9 |
| 3c-IIa | 1.53 | 1.50 | 45 | 1.53 | 0.5 | 90 | 3.2 | −1.05 | 121 | 11.8 |
| 3c-IIb | 1.53 | 1.53 | 45 | 1.86 | 0.5 | 90 | 2.7 | −1.28 | 120 | 16.5 |

This design has an AC referenced half-wave voltage of $V_\pi$=1.6 V. For comparison, if we use a DC reference with this design a 2.3 cm interaction length would be required to get a DC referenced 30 GHz electrical bandwidth resulting in a DC $V_\pi$ of ~1.9 volts, which represents ~20% increase in required drive voltage. The final design is also based on design 3(c) and is labeled 3(c)-IIa, has a 120 GHz bandwidth, 1.53 cm interaction length, and 0.5 μm thick Au electrodes with conductivity 90% that of bulk gold. This design has an AC referenced half-wave voltage of $V_\pi$=3.2 V. However, we note that at high frequency operation the effective index mismatch of 0.03 (between microwave and optical) is large enough to cause a significant degradation in device response. So for comparison we show that if such a design were perfectly velocity matched a 120 GHz bandwidth could be achieved with a 1.86 cm interaction length resulting in a low frequency half-wave voltage of 2.7 V, this design is labeled 3(c)-IIb.

An effective index mismatch of 0.03 was chosen (somewhat arbitrarily) in our designs in recognition of the potential for processing and materials variations to make it difficult to achieve an exact velocity match in commercially manufactured modulators. In addition, we have not spent significant effort in determining realistic expectations for the impact that material and processing variability may have on the reproducibility of the microwave and optical propagation constants. However, we believe that achieving a consistent index match within the modulator interaction region of <0.03 is a very conservative expectation.

We note that the figures of merit for the AC referenced designs are significantly better than those for the DC refertechnique single ended devices with a 40 GHz 3 dB electrical bandwidth and a drive voltage of ~2.2 V at an optical wavelength of 1.3 μm can be realized which results in a figure of merit of ~8. Using the techniques presented herein the modulator design can be modified to achieve a 30 GHz 3 dB electrical bandwidth and a single-ended drive voltage of ~1.6V, resulting in a drive voltage reduction of ~16% and an improved figure of merit of 11.7. This corresponds to a ~1.85 $V_\pi$ drive voltage at 1.5 μm.

It can now be seen that, in a first aspect, the invention is an electro-optic phase shifter for electrically changing the phase of light traveling therethrough. The device comprises an optical waveguiding structure comprising a waveguiding core of electro-optic material and a cladding peripherally surrounding the core. At least two electrodes are provided for applying an AC electrical field across the core.

The optimal electrode thickness is dependent on the conductivity of the electrode metal. At least one electrode has a thickness less than about three times the skin depth at the 3 dB frequency and preferably less than two times the skin depth. In contemplated devices the 3 dB bandwidth is about 7 GHz or greater. For commonly used electrode materials the thickness is about two micrometers or less and preferably about 0.5 micrometer or less. Such thin electrodes produce a more uniform modulation response.

The electro-optic material can be an electro-optic polymer, a ferroelectric oxide or a semiconductor. The preferred electrode material comprises gold.

In a second aspect of the invention, an electro-optic switch or modulator comprises a pair of optical waveguides interacting by a beam splitter and a beam combiner in that a light beam on one of the waveguides is split to both waveguides by a first of the couplers and recombined at a second of the couplers. At least one of the waveguides includes an electro-optic phase shifter as described above.

It is understood that the above-described embodiments are illustrative of only a few of the many possible specific embodiments, which can represent applications of the invention. Numerous and varied other arrangements can be made by those skilled in the art without departing from the spirit and scope of the invention.

REFERENCES

1. Y. Shi, W. Wang, J. Bechtel, A. Chen, S. Garner, S. Kalluri, W. H. Steier, D. Chen, H. R. Fetterman, L. R. Dalton, and L. Yu, "Fabrication and characterization of high-speed polyurethane-disperse red 19 integrated electrooptic modulators for analog system applications" *IEEE J. Sel. Topics Quantum Electron.*, 2, 289–299 (1996).
2. M. C. Oh, H. Zhang, C. Zhang, H. Erlig, Y. Chang, B. Tsap, D. Chang, A. Szep, W. H. Steier, H. R. Fetterman, and L. R. Dalton, "Recent advances in electrooptic polymer modulators incorporating highly nonlinear chromophore" *IEEE J. Sel. Topics Quantum Electron.*, 7, 826–835 (2001).
3. A. H. Udupa, H. Erlig, B. Tsap, Y. Cahnge, D. Chang, H. R. Fetterman, Hua Zhang, Sang-Shin Lee, Fang Wang, W. H. Steier, and L. R. Dalton, "High-frequency, low-crosstalk modulator arrays based on FTC polymer systems," *Electron. Lett.*, 35, 1702–1704 (1999)
4. D. M. Gill, D. Jacobson, and R. Wolfe, "Electro-optic modulators," U.S. Pat. No. 6,172,791 (2001).
5. F. Heismann, S. K. Korotky, and J. J. Veselka, "Lithium niobate integrated optics: Selected contemporary devices and system applications," in *Optical Fiber Telecommunications III B*, I. P. Kaminow and T. L. Koch, eds. (Academic, San Diego, Calif., 1997), pp. 377–462.
6. M. Lee, H. Katz, C. Erben, D. M. Gill, P. Gopalan and J. D. Heber, to be published.
7. S. J. Chang, C. L. Tsai, Y. B. Lin, J. F. Liu, and W. S. Wang, "Improved electrooptic modulator with ridge structure in X-cut LiNbO₃," *J. Lightwave Technol.*, 17, 843–847 (1999).
8. K. Noguchi, O. Mitomi, H. Miyazawa, and S. Seki, "A broadband Ti:LiNbO₃ optical modulator with a ridge structure," *J. Lightwave Technol.*, 13, 1164–1168 (1995).
9. D. Chen, H. R. Fetterman, A. Chen, W. H. Steier, L. R. Dalton, W. Wang, and Y. Shi, "Demonstration of 110 GHz electro-optic polymer modulators" *Appl. Phys. Lett.*, 70, 3335–3337 (1997).
10. A. Chowdhury and L. McCaughan, "Figure of merit for near-velocity-matched traveling-wave modulators," *Opt. Lett.*, 26, 1317–1319 (2001).
11. D. A. Fishman, Lucent Technologies, Holmdel, N.J. (personal communication, April, 2002).
12. W. K. Burns, M. M. Howerton, R. P. Moeller, R. Krahenbuhl, R. W. McElhanon, and A. S. Greenblatt, "Low drive voltage, broad-band LiNbO₃ modulators with and without etched ridges," *J. Lightwave Technol.*, 17, 2551–2555 (1999).

What is claimed:

1. An electro-optic phase shifting device for changing the phase of light traveling therethrough in response to a modulating voltage signal, the device having an electrical bandwidth response comprising a 3 dB frequency f greater than about 7 GHz at which the phase shift response to the modulating voltage is reduced by 3 dB, the device comprising:

an optical waveguiding structure comprising a waveguiding core of electro-optic polymer or semiconductor and a cladding peripherally surrounding the core;

the waveguiding core having an etched ridge structure; and at least two electrodes for applying the modulating signal across the core, wherein at least one of the electrodes has a thickness less than about two times the skin depth in the electrode at the 3 dB frequency f.

2. An electro-optic phase shifting device for changing the phase of light traveling therethrough in response to a modulating voltage signal, the device having an electrical bandwidth response comprising a 3 dB frequency f greater than about 7 GHz at which the phase shift response is reduced by 3 dB, the device comprising:

an optical waveguiding structure comprising a waveguiding core of electro-optic polymer and a cladding peripherally surrounding the core; and at least two electrodes for applying the modulating signal across the core, wherein at least one of the electrodes has a thickness less than about 0.5 micrometers.

3. An electro-optic phase shifting device for changing the phase of light traveling therethrough in response to a modulating voltage signal, the device having an electrical bandwidth response comprising a 3 dB frequency f greater than about 7 GHz at which the phase shift response to the modulating voltage is reduced by 3 dB, the device comprising:

an optical waveguiding structure comprising a waveguiding core of electro-optic polymer and a cladding peripherally surrounding the core; and at least two electrodes for applying the modulating signal across the core, wherein at least one of the electrodes has a thickness less than about three times the skin depth in the electrode at the 3 dB frequency f.

4. The phase shifting device of claim 3 wherein the at least one electrode comprises gold.

5. The phase shifting device of claim 3 wherein the waveguiding core comprises a pair of optical waveguides interacting by a beam splitter whereby a light beam is split to both of the waveguides and by a combiner whereby the light beams on the two waveguides are recombined.

6. The phase shifting device of claim 1 wherein the waveguiding core comprises a pair of optical waveguides interacting by a beam splitter whereby a light beam is split to both of the waveguides and a combiner whereby the light beams on the two waveguides are recombined.

7. The phase shifting device of claim 2 wherein the waveguiding core comprises a pair of optical waveguides interacting by a beam splitter whereby a light beam is split to both of the waveguides and a combiner whereby the light beams on the two waveguides are recombined.

* * * * *